US008652976B2

(12) United States Patent
Kalbe et al.

(10) Patent No.: US 8,652,976 B2
(45) Date of Patent: Feb. 18, 2014

(54) FIXABLE NONWOVEN INTERLINING MATERIAL USED IN THE TEXTILE INDUSTRY

(75) Inventors: Michael Kalbe, Weinheim (DE); Oliver Staudenmayer, Weinheim (DE); Manfred Jöst, Hemsbach (DE); Peter Rudek, Worms (DE)

(73) Assignee: Carl Freudenberg KG, Weinheim (DE)

( * ) Notice: Subject to any disclaimer, the term of this patent is extended or adjusted under 35 U.S.C. 154(b) by 1201 days.

(21) Appl. No.: 11/915,354

(22) PCT Filed: Apr. 20, 2006

(86) PCT No.: PCT/EP2006/003595
§ 371 (c)(1),
(2), (4) Date: Dec. 12, 2008

(87) PCT Pub. No.: WO2006/128521
PCT Pub. Date: Dec. 7, 2006

(65) Prior Publication Data
US 2009/0214846 A1 Aug. 27, 2009

(30) Foreign Application Priority Data
Jun. 1, 2005 (DE) .......................... 10 2005 025 550

(51) Int. Cl.
*D04H 1/00* (2006.01)
*D04H 1/10* (2006.01)
*D04H 1/54* (2012.01)
*B32B 5/26* (2006.01)

(52) U.S. Cl.
USPC ........... 442/329; 442/328; 442/381; 442/389; 442/409

(58) Field of Classification Search
USPC ............... 442/327–415; 428/195.1, 198, 343, 428/346, 347; 427/291
See application file for complete search history.

(56) References Cited

U.S. PATENT DOCUMENTS

| 4,209,553 A | * | 6/1980 | Greenberg | 427/179 |
| 4,217,256 A | * | 8/1980 | Peerman et al. | 528/289 |
| 5,016,829 A | | 5/1991 | Schippers et al. | |
| 5,652,041 A | * | 7/1997 | Buerger et al. | 428/198 |
| 6,387,471 B1 | | 5/2002 | Taylor et al. | |
| 2003/0162458 A1 | * | 8/2003 | Tsujiyama et al. | 442/329 |

FOREIGN PATENT DOCUMENTS

| DE | 10084227 | 2/2002 |
| EP | 1101855 | 5/2001 |
| GB | 1556504 | 11/1979 |
| JP | 2503903 | 11/1900 |
| JP | 53126363 | 11/1978 |
| JP | 63235509 | 9/1988 |
| JP | 07026458 | 1/1995 |
| WO | 97/30843 | 8/1997 |
| WO | 2004018193 | 3/2004 |

OTHER PUBLICATIONS

Stryker, "Selecting and Using Interfacing", Cooperative Extension Service, Kansas State University, Manhattan, May 1981.*
Kopnick, "Polyesters", p. 18, Ullmann's Encyclopedia, Wiley-VCH Verlag GmbH & Co. copyright 2005.*
Franz Fourné, "Synthetische Fasern", Handbuch fuer Anlagenplanung, Maschinenkonstruktion und Betrieb (Handbook for System Planning, Machinery and Construction Supplies), Carl Hanser Publishing House, Munich, Germany, Mar. 23, 1995, p. 847.

* cited by examiner

*Primary Examiner* — Jennifer A Steele
(74) *Attorney, Agent, or Firm* — Grossman, Tucker, Perreault & Pfleger, PLLC

(57) ABSTRACT

The invention relates to a fixable nonwoven interlining material for use in the textile industry, comprising at least one melt-spun fiber layer and at least one additional fibrous material layer, the fixable interlining material being provided with an adhesive substance at least in partial regions. A particularly high elasticity of the fixable interlining material is achieved by the fact that the melt-spun fibers are composed of an elastic fibrous material, and the at least one layer of fibrous material is composed of staple fibers, and the at least one elastic melt-spun fiber layer and the at least one staple fiber layer are laid one on top of the other in the form of a flat unbonded fiber fabric, and are subsequently bonded by use of a bonding step known as such.

9 Claims, No Drawings

FIXABLE NONWOVEN INTERLINING MATERIAL USED IN THE TEXTILE INDUSTRY

The invention relates to a fixable nonwoven interlining material for use in the textile industry, comprising at least one melt-spun fiber layer and at least one additional fiber layer, the fixable interlining material being provided with an adhesive substance at least in partial regions.

Interlining materials are the unseen framework of clothing. They provide for correct fit and optimum wear comfort. Depending on the application, they contribute to processability, increase functionality, and stabilize the clothing. In addition to clothing, these functions may find use in commercial textile applications, for example furniture, upholstery, and the home textile industry.

Interlining materials may be composed of nonwoven fabrics, woven fabrics, knitted fabrics, or similar textile fabrics, which are usually also provided with an adhesive substance by means of which the interlining may be adhesively joined to an outer fabric, usually by thermal means, using heat and/or pressure (fusible interlining). The various referenced textile fabrics have different property profiles, depending on the manufacturing method. Woven fabrics are composed of threads/yarns in a warp and weft orientation; knitted fabrics are composed of threads/yarns which are joined into a textile fabric by means of machine binding. Nonwoven fabrics are composed of individual fibers which are thermally, mechanically, or chemically bound. The various methods for manufacturing textile fabrics are well known and require no explanation.

The outer fabrics used in clothing are likewise manufactured using well-known methods. To achieve the most homogeneous bond possible between the outer fabric and the interlining material, the property profile of the interlining material must be matched to that of the outer fabric. Important criteria are the hand, the feel of the outer fabric/interlining material composite, and, if applicable, the adhesion of the interlining material to the outer fabric. Additional requirements result from the care features of the outer fabric/interlining material composite, for example for laundering or dry cleaning. Long-term wearability and the characteristics of the interlining material in the garment during wear are important criteria for use.

In the field of outer fabrics there are a large number of different materials which are constantly being supplemented with new materials having new properties. One fashion trend involves outer fabrics which may be reversibly fitted to the body while being worn, thus providing comfort while wearing the garment. These outer fabrics which are used exhibit mono-, bi-, or multidirectional elastic behavior; i.e., the outer fabrics may be stretched, but then relax to return to their original state. The outer fabric is thus able to participate in the motions of the body in a flexible manner, while at the same time also invokes a soft, pleasant feel when the garment is worn. A prerequisite for making full use of the elastic properties of an outer fabric in a garment is an interlining material which is able to conform to these stretching and relaxation motions. A nonstretchable interlining material which is fixed to an elastic outer fabric by means of an adhesive substance would hinder stretching and relaxation of the outer fabric. For interlining materials composed of woven fabrics, knitted fabrics, meshed fabrics, Raschel materials, and other yarn-containing fabrics, the required elasticity is usually achieved by using specialized crimped yarns and/or specialized customary textile treatments such as expansion, shrinkage, and the like. This results in an artificial shortening of the yarn in the textile fabric; the yarn may be stretched out again, but is still strong enough to be able to elastically contract.

Nonwoven fabrics, which are defined as bonded single-fiber fabrics whose individual fibers are joined by means of friction and/or cohesion and/or adhesion, typically do not exhibit this characteristic. Japanese Unexamined Patent Application JP 2-503903 A, which constitutes the generic prior art for the present patent application, describes an interlining material composed of nonwoven fabric which is manufactured using a laminating process. The known interlining material is composed of multiple layers of interlaced-fiber nonwoven fabric and fiber webs which are laminated together. At least one layer is composed of a melt-blown nonwoven fabric made of ultrathin fibers. For fixing, the laminated nonwoven fabric is provided, at least in places, with an adhesive substance in a manner known as such.

The object of the present invention is to refine a fixable interlining material of the generic type in such a way that it has sufficiently high elasticity for clothing parts or textile applications.

For a fixable interlining material of the generic type, the object is achieved according to the invention by the fact that the melt-spun fibers are composed of an elastic fibrous material, and the at least one layer of fibrous material is composed of staple fibers, and the at least one elastic melt-spun fiber layer and the at least one unbound staple fiber layer are laid one on top of the other in the form of a flat unbonded fiber fabric, and are subsequently bonded, using a bonding step known as such which is typical in the manufacture of nonwoven fabrics, to produce a nonwoven fabric.

Surprisingly, it has been shown that when an unbound fiber fabric composed of staple fibers is used in combination with an elastic fiber fabric composed of elastic melt-spun fibers and the composite is subsequently bonded, a maximum elasticity is obtained which could not be achieved in the production of a laminate from a previously bound staple fiber nonwoven fabric and a stretchable nonwoven fabric.

One advantage of the interlining material according to the invention is the elasticity in the longitudinal and transverse directions of the material, which may be adjusted over a wide range via the type of laying of the nonwoven fabric, the staple fiber composition, the type of elastic polymer, and the melt spinning and bonding conditions. The hand of elastic polymers, which usually has a "rubber elastomer" feel, is masked and made acceptable by the use of staple fibers.

Thus, according to the invention an elastic material is spun into elastic fibers in a melt spinning process, and these fibers are laid in the form of an elastic fiber fabric. In a further method step a nonbonded fiber fabric composed of staple fibers is laid on at least one of the two surfaces of this elastic fiber fabric. The at least two-layer fiber fabric composed of melt-spun fibers and staple fibers is then bonded mechanically (needling, water jet bonding), chemically (bound using binder), or preferably thermally, for example, by calendering between rollers, to produce a nonwoven fabric. Whereas in the manufacture of the generic fixable interlining material it is necessary not only to perform an individual bonding process for each layer, but also at the end to perform an additional laminating process on the layer composite, manufacture of the interlining material according to the invention requires only a single bonding step. The nonwoven fabric according to the invention is therefore easier and more economical to manufacture than the generic nonwoven fabric.

In a subsequent coating process using an adhesive substance according to common techniques for interlining materials, for example paste dot, paste-powder dot, hot-melt application, dispersion coatings, or the like, a surprisingly highly elastic, fixable product with a pleasant feel is obtained, at least in partial regions of the surface of the composite.

The materials used for the melt-spun fibers preferably include elastic polymers having a melting point of greater than 165° C., particularly preferably greater than 170° C., so that the textile can withstand ironing without damage. Well-suited elastic polymers typically have a Shore A hardness of <98, although harder polymers may be used, depending on the elasticity requirements.

Particularly preferred elastic polymers are compounds from the family of thermoplastic polyurethanes, for example having an aliphatic or aromatic structure and based on polyester, polyether, or polycaprolactone, for example. Further examples of suitable elastic polymers include compounds based on polyether block copolyamides or elastic copolyesters, such as copolyether esters.

After processing, these types of laminate structures may be smoothed very easily by ironing, for example, resulting in a very attractive structure at the seams, for example. This effect is facilitated by use of elastic polymers having a low glass transition point.

In principle, a suitable staple fiber for the at least two-layer fiber fabric is any type of fiber which is able to withstand ironing without melting. The staple fibers used may include chemical fibers and/or natural fibers which are common in interlining materials. For chemical fibers, thermally stable fibers having a melting point >165° C., for example polyester or polyamide fibers or mixtures thereof, are preferred. Fibers composed of different polymer components are also suitable as chemical fibers.

The preferred titer range is <2.5 dtex, although higher[1] fiber titers of 2.5 to 30 dtex, or mixtures of fibers having titers of 0.8 to 30 dtex, are conceivable.

[1] Translator's note:"Größerer" (larger, higher) was apparently intended in the source document instead of "gröberer" (coarser, rougher).

The weight of the elastic, melt-spun, fibrous fabrics may preferably vary between 5 and 100 g/m². The nonbonded staple fiber web may have a mass per unit area of 5-200 g/m².

The invention is explained in greater detail below with reference to exemplary embodiments, without limiting universality.

In the following exemplary embodiments, for a comparison of generic products and products according to the invention the extensibility of the nonwoven fabric interlinings was evaluated according to the following internal method:

A 20×20 cm measurement section was sketched on a specialized template. A scale was plotted along the measurement section (x/y axis), beginning at the end of the 20 cm. The scale was provided with 1-cm increments, 1 cm corresponding to 5% elongation. For the determination, an elastic flat product was laid without tension on the zero point of the 20×20 cm measurement section, affixed, and extended until it came to a blockage, at which point the product was able to contract back to the starting state. The extension up to the blockage of the material was read on the scale. The measurement was carried out in the longitudinal and transverse directions, resulting in elongation values expressed in %.

Examples 1 through 3 represent interlining materials according to the invention. Examples 4 and 5 were prepared according to the generic prior art, and on account of the differing production techniques Example 2 was compared with Example 4, and Example 3 was compared with Example 5.

EXAMPLE 1

A dried polymer (<0.1% moisture) from the class of polyester-based thermoplastic polyurethanes having a Shore A hardness of 85, MFI 17 at 210° C., 2.16 kp, and a melting range of 170-184° C. (Kofler heating bench) was spun into a fiber fabric using a melt-spin technique. The fiber fabric had a mass per unit area of 15 g/m².

In a carding process this fiber fabric was fed to a fibrous web composed of 10 g/m² PA staple fibers of 1.7 dtex, and was bonded at calender temperatures >150° C. One of the calender rollers had an engraving with a >9% welding surface. After a double dot coating (9 g/m³ polyamide adhesive substance, cp 52 at 170° dryer temperature) the elastic fixable interlayer had a reversible elongation of at least 25% in the transverse direction and 13% in the longitudinal direction according to the test described at the outset.

EXAMPLE 2

A dried polymer (<0.1% moisture) from the class of polyester-based thermoplastic polyurethanes having a Shore A hardness of 85, MFI 17 at 210° C., 2.16 kp, and a melting range of 170-184° C. (Kofler heating bench) was spun into a fiber fabric using a melt-spin technique. The fiber fabric had a mass per unit area of 15 g/m².

In a carding process this fiber fabric was fed to a fibrous web composed of 10 g/m2 PA staple fibers of 1.7 dtex, and was bonded at calender temperatures >150° C. One of the calender rollers had an engraving with a >9% welding surface. After a paste coating (10 g/m³ polyamide adhesive substance, cp 52 at 120° dryer temperature) the elastic fixable interlayer had a reversible elongation of 50% in the transverse direction and 23% in the longitudinal direction according to the test described at the outset.

EXAMPLE 3

A dried polymer (<0.1% moisture) from the class of polyester-based thermoplastic polyurethanes having a Shore A hardness of 85, MFI 17 at 210° C., 2.16 kp, and a melting range of 170-184° C. (Kofler heating bench) was spun into a fiber fabric using a melt-spin technique. The fiber fabric had a mass per unit area of 15 g/m².

In a carding process this fiber fabric was fed to an unbound fibrous web composed of 10 g/m² PA staple fibers of 1.7 dtex, and was bonded using the water jet technique. After a paste coating (9 g/m³ polyamide adhesive substance, cp 52 at 120° dryer temperature) the elastic fixable interlayer had a reversible elongation of at least 40% in the transverse direction and 17% in the longitudinal direction according to the test described at the outset.

EXAMPLE 4

A polymer (<0.1% moisture) from the class of polyester-based thermoplastic polyurethanes having a Shore A hardness of 85, MFI 17 at 210° C., 2.16 kp, and a melting range of 170-184° C. (Kofler heating bench) was spun into fibers using a melt-spin technique. These fibers were laid on a staple fiber nonwoven fabric composed of 18 g/m2 staple fibers (85% PA/15% PES), each at 1.7 dtex, using the PS technique, and the two-layer structure composed of bonded staple fiber nonwoven fabric and polyurethane fiber fabric was bonded at calender temperatures >150° C. One of the calender rollers had an engraving with a >9% welding surface. The fiber fabric had a mass per unit area of 33 g/m².

After a paste coating (9 g/m³ polyamide adhesive substance, cp 52 at 120° dryer temperature) the elastic fixable interlayer had a reversible elongation of approximately 20% in the transverse direction and 7% in the longitudinal direction according to the test described at the outset.

EXAMPLE 5

A polymer (<0.1% moisture) from the class of polyester-based thermoplastic polyurethanes having a Shore A hardness of 85, MFI 17 at 210° C., 2.16 kp, and a melting range of 170-184° C. (Kofler heating bench) was spun into fibers using a melt-spin technique. These fibers were laid on a water jet-bonded staple fiber nonwoven fabric composed of 18 g/m² staple fibers (85% PA/15% PES), each at 1.7 dtex, and the two-layer structure composed of bonded staple fiber nonwoven fabric was bonded once again using the water jet technique. The fiber fabric had a mass per unit area of 33 g/m².

After a paste coating (9 g/m³ polyamide adhesive substance, cp 52 at 120° dryer temperature) the elastic interlayer had a reversible elongation of approximately 20% in the transverse direction and 12% in the longitudinal direction according to the test described at the outset. This material is clearly inferior to that of Examples 1, 2, and 3.

It is noted that the interlining materials according to the invention from Examples 1, 2, and 3 are clearly superior to the generic materials with regard to extensibility, i.e., elasticity.

The invention claimed is:

1. Fixable nonwoven interlining material for use in the textile industry, comprising a composite of at least one melt-spun fiber layer and at least one additional fibrous material layer, the composite including a polyamide adhesive for joining said interlining material to an outer fabric, said adhesive applied to a surface of said composite in at least regions of said surface, wherein the melt-spun fiber layer contains fibers that consist of compounds from the family of elastic thermoplastic polyurethanes having a Shore A hardness of <98, and the at least one layer of fibrous material is composed of staple fibers, and the melt-spun fiber layer and the at least one staple fiber layer are laid one on top of the other in the form of a flat unbonded fiber fabric, and are subsequently bonded wherein said melt-spun fibers have a melting point in the range of 170° C. to 184° C. and wherein said composite has a reversible elongation of at least 13%.

2. Fixable interlining material according to claim 1, characterized in that the at least one additional fibrous material layer is composed predominantly of staple fibers made of chemical and/or natural fibers.

3. Fixable interlining material according to claim 2, characterized in that the chemical fibers have a melting point >165° C.

4. Fixable interlining material according to claim 3, characterized in that the chemical fibers comprise single- and/or multicomponent fibers composed of polyester and/or polyamide, or fiber mixtures of these components.

5. Fixable interlining material according to claim 1, characterized in that the thermoplastic polyurethanes have an aliphatic or aromatic structure.

6. Fixable interlining material according to claim 1, characterized in that the thermoplastic polyurethanes are based on polyester, polyether, or polycaprolactone.

7. Fixable interlining material according to claim 1, characterized in that the staple fibers have a fiber titer <2.5 dtex.

8. Fixable interlining material according to claim 1, characterized in that the unbonded fiber fabric composed of staple fibers has a mass per unit area in the range of 1-100 g/m².

9. Fixable interlining material according to claim 1, characterized in that the unbonded fiber fabric composed of melt-spun fibers has a mass per unit area in the range of 5-200 g/m².

* * * * *